United States Patent Office 3,558,501
Patented Jan. 26, 1971

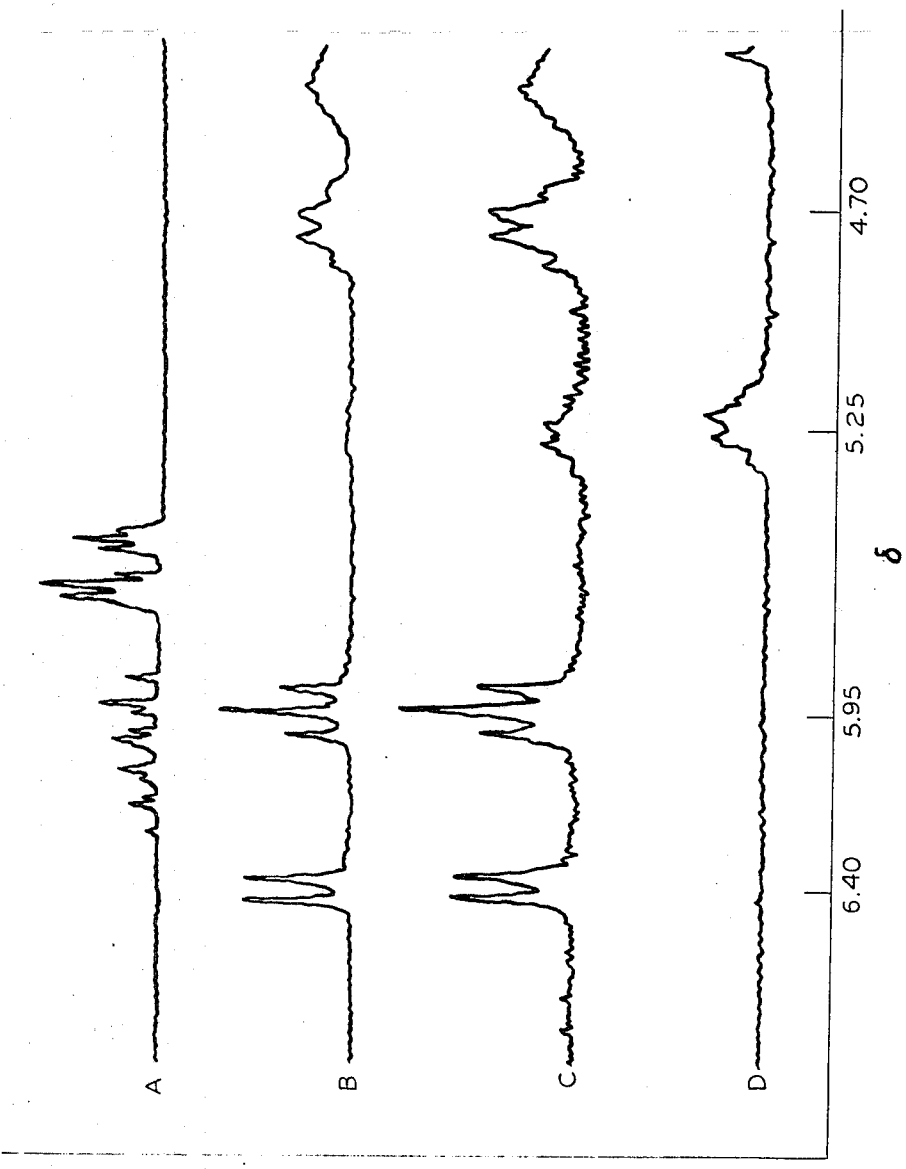

3,558,501
PROCESS FOR THE CHLOROHYDRINATION OF ALLYLTRIMETHYLAMMONIUM CHLORIDE
Thomas A. McGuire and Charles L. Mehltretter, Peoria, Ill., assignors to the United States of America as represented by the Secretary of Agriculture
Filed May 1, 1969, Ser. No. 820,754
Int. Cl. C07c 87/30
U.S. Cl. 252—182                                   3 Claims

ABSTRACT OF THE DISCLOSURE

Allyltrimethylammonium chloride reacted with hypochlorous acid in aqueous solution at 25° to 32° C. forms a mixture of monochlorohydroxypropyltrimethylammonium chlorides in nearly quantitative yield with essentially no formation of dichloropropyltrimethylammonium chloride. The product is of value for reaction with starch and cellulose to produce industrial cationic polysaccharides.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the discovery that monochlorohydroxypropyltrimethylammonium chlorides can be formed in at least 98 percent yield by the chlorohydrination of allyltrimethylammonium chloride in water solution at 25° to 32° C. The prior art has shown that chlorohydrination at 69° C. yields only about 70 percent of the monochloro compounds and about 30 percent of unreactive dichloropropyltrimethylammonium chloride.

Manufacturers of cationic starch ethers and of cationic cellulose ion exchange resins benefit from this discovery in that now such cationic products may be produced more efficiently by reaction of the monochloro product of the invention with starch or cellulose with the essential absence of toxic dichloro compound in final process effluents.

This invention relates to the preparation of quaternary ammonium salts. More particularly, it relates to the improved preparation of chlorohydroxypropyltrimethylammonium chloride in quantitative yield by chlorohydrination of allyltrimethylammonium chloride. The chlorohydroxypropyltrimethylammonium chloride thus obtained is a mixture of isomeric N-(2-chloro-3-hydroxypropyl)trimethylammonium chloride and N-(3-chloro-2-hydroxypropyl)trimethylammonium chloride as shown in the following equation substantially free of N-(2,3-dichloropropyl)trimethylammonium chloride and is of great value for reaction with starch for the commercial production of cationic ethers.

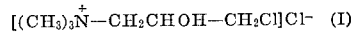

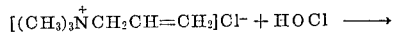

It is known in the art that allyltrimethylammonium chloride can be chlorohydrinated with hypochlorous acid to produce a mixture of isomeric monochlorohydroxypropyltrimethylammonium chlorides. This method of preparation of the monochlorohydroxypropyltrimethylammonium chlorides as described in U.S. Pat. 3,346,563 is complicated by the fact that a sizable quantity of N-(2,3-dichloropropyl)trimethylammonium chloride is also produced which obviously decreases the yield of the monochloro derivatives a corresponding amount. In Examples 1 and 16 of that patent, allyltrimethylammonium chloride was chlorohydrinated in water for 40 minutes when the temperature rose from 24° to 69° C. (Example 1). The crystalline reaction product that was obtained was a mixture of 0.7 mole of monochlorohydroxypropyltrimethylammonium chlorides and 0.3 mole of dichloropropyltrimethylammonium chloride (Example 16). The latter compound is stated to be unreactive toward starch and therefore would be a contaminant in effluent process liquors led to the sewer, contributing considerably to pollution of our rivers with toxic organic halogen compounds. It has now been discovered that when chlorohydrinating allyltrimethylammonium chloride at 42° to 46° C. the reaction proceeds as described in the above patent to form not only the monochlorohydroxypropyltrimethylammonium chlorides but also substantial quantities of the inactive dichloropropyltrimethylammonium chloride as determined by elemental analysis of the crystalline reaction product and as shown in the figure (spectrum C) using NMR spectroscopy. It has also been discovered that by operating between the temperature range of 25° to 32° C. it is possible to control the reaction to produce an essentially quantitative yield of monochlorohydroxypropyltrimethylammonium chlorides as determined by elemental analysis of the crystalline reaction product and as shown in the figure (spectrum B) using NMR spectroscopy. Concentration of allyltrimethylammonium chloride is not critical and 15 to 35 percent in water were used in the improved process. The present invention involves a process in which the maximum percentage of monochlorohydroxypropyltrimethylammonium chlorides may be obtained.

It is, therefore, an object of the present invention to provide an improved process of reacting allyltrimethylammonium chloride with hypochlorous acid in order to obtain the monochlorohydroxypropyltrimethylammonium chlorides referred to above, while at the same time minimizing the formation of dichloropropyltrimethylammonium chloride in the reaction product.

Obviously, the reaction solution obtained at 25° to 32° C. chlorohydrination can be used directly for etherification of starch or the monochlorohydroxypropyltrimethylammonium chloride mixture can be isolated by concentrating the solution to the crystalline dry product for subsequent reaction with starch, cellulose, or other polysaccharides. The substantially quantitative yield of monochlorohydroxypropyltrimethylammonium chlorides will allow more efficient reaction with starch and will greatly reduce stream pollution by toxic dichloropropyltrimethylammonium chloride in effluent process liquors. The following examples will further illustrate the embodiment of our invention.

EXAMPLE 1

Chlorohydrination of allyltrimethylammonium chloride: reaction at 25° to 30° C. The chlorohydrination reaction was carried out in a 600-ml. side inlet gas-washing bottle equipped with a 60-mm. diameter fritted disc. A 370-ml. aqueous solution containing 55.6 g. (0.41 mole) of allyltrimethylammonium chloride (15 percent) was placed in the reaction bottle in a circulating cold-water bath to maintain the reaction temperature at 25° to 30° C., and 32 g. (0.45 mole) of chlorine was passed through the solution in 2.5 hours. The theoretical amount of chlorine required is 29.2 g. The solution was aerated to eliminate free chlorine and then removed from the bottle. After the bottle was washed thoroughly with water, the washings were combined with the colorless reaction solution (pH 0.4) and adjusted to a volume of 500 ml. with water. A 50-ml. portion of this solution was concentrated in vacuo to a sirup which was dissolved in 50 ml. of isobutanol and again evaporated to remove residual water as the azeotrope. The crystalline mixture of N-(2- chloro-3-hydroxypropyl)- and N-(3 - chloro-2-hydroxypropyl)trimethylammonium chlorides that formed was triturated with acetone. Supernatant acetone was then decanted, and the residual product after drying in vacuo at 100° C. for 2 hours weighed 7.55 g. (Theory: 7.71 g. Yield: 98 percent.)

*Analysis.*—Calculated for $C_6H_{15}Cl_2NO$ (percent): N, 7.45; ionic Cl, 18.84. Found (percent): N, 7.54; ionic Cl, 19.0.

EXAMPLE 2

To determine the effect of increasing the concentration of allyltrimethylammonium chloride on the course of the chlorohydrination, a second low-temperature run was made (27° to 32° C.) as in Example 1 using 70.6 g. (0.52 mole) of allyltrimethylammonium chloride in 200 ml. of solution (35 percent) and 37 g. of chlorine. The combined volume of the aerated reaction mixture and bottle washings was 250 ml. A 25-ml. portion of this solution, worked up like the first, gave 9.44 g. of crystalline monochlorohydroxypropyltrimethylammonium chlorides. (Theory: 9.78 g. Yield: 96.5 percent.)

*Analysis.*—Found (percent): N, 7.36; ionic Cl, 18.8.

Analytically, the monochlorohydroxypropyltrimethylammonium chloride products of both low-temperature experiments (Examples 1 and 2) contained no significant amount of dichloropropyltrimethylammonium chloride and were obtained in high yield.

EXAMPLE 3

Reaction at 42° to 46° C. A chlorohydrination experiment was performed as in Example 1 but at 42° to 46° C. with 174 ml. of solution that contained 28.2 g. (0.208 mole) of allyltrimethylammonium chloride (16.8 percent). Over 1.5 hours, 17 g. (0.239 mole) of chlorine gas was led into the solution that was maintained at 42° to 46° C. by an outside water bath. The reaction mixture was then aerated, and the combined solution and bottle washings had a volume of 265 ml. A 50-ml. portion of the solution was concentrated in vacuo to a sirup in a rotary evaporator and processed in the manner of the previous runs. The white crystalline product that was obtained weighed 6.80 g. (Theory: 7.38 g. Yield: 92 percent.)

*Analysis.*—Found (percent): N, 7.25; ionic Cl, 18.1; total Cl, 42.1; calculated total Cl for monochlorohydroxytrimethylammonium chloride, 37.70.

Total chlorine and ionic chlorine analyses indicate the presence of 32 to 43 percent, respectively, of dichloropropyltrimethylammonium chloride in the final product. To characterize the products in a more definitive manner, an NMR study was made. Proton magnetic resonance spectroscopy allowed a comparison of the spectra of the several products in solution.

Nuclear magnetic resonance study. The NMR spectra were recorded on a Varian Associates HA–100 spectrometer operating at 100 mHz. with 6 percent solutions of the products in deuterated dimethyl sulfoxide (DMSO-$d_6$) and a probe temperature of approximately 33° C. The instrument was operated in a proton lock mode with tetramethylsilane as the internal standard. Chemical shifts were reported in p.p.m. on the $\delta$ scale.

The figure illustrates the spectra for allkyltrimethylammonium chloride (A), the chlorohydrination product from Example 2(B), the high-temperature chlorohydrination product from this example (C), and N-(2,3-dichloropropyl)trimethylammonium chloride (D). The spectrum of A has the normal pattern for terminal olefinic protons at $\delta$ 6.3 to $\delta$ 5.5, except that the protons have been deshielded about 0.8 p.p.m. by the proximity of the nitrogen nucleus. The spectrum for compound D has a multiplet at $\delta$ 5.25, equivalent to one proton. This resonance has a low field position, which indicates that it is produced by the CHCl proton. Decoupling experiments showed this proton to be coupled to two groups of protons.

A comparison of the spectrum of product B with those of the known compounds A and D shows the absence of olefinic protons in B and only a trace of a signal at $\delta$ 5.25, corresponding to the presence of only a slight amount of dichloropropyltrimethylammonium chloride. Signals at $\delta$ 6.40 (doublet) and $\delta$ 5.95 (triplet) represent the hydroxyl protons behavior in DMSO. The doublet is produced by the secondary hydroxyl in isomer I of the equation and the triplet, by the primary hydroxyl in isomer II. The ratio of primary to secondary hydroxyl in B is approximately 3 to 2.

The spectrum of C has the same general pattern as that of product B, but the multiplet signal at $\delta$ 5.25 is much stronger and clearly indicates the presence of a substantial quantity of dichloropropyltrimethylammonium chloride in product C. The absence of the olefinic line position in the spectra of both chlorohydrination product mixtures shows that complete reaction of allyltrimethylammonium chloride had occurred.

We claim:

1. An improved process for preparing a mixture of N-(2 - chloro - 3 - hydroxypropyl)trimethylammonium chloride and N-(3-chloro-2-hydroxypropyl)trimethylammonim chloride in at least 96 percent yield, the improvement being the chlorohydrination of 1 mole equivalent of allyltrimethylammonium chloride in a concentration of 15 to 35 percent in water by passing 1.2 mole equivalents of chlorine gas through the solution at 25° to 32° C. and after the reaction is completed, removing unreacted chlorine from the solution by aeration.

2. The product as prepared by the process of claim 1.

3. The dry composition comprising 98 to 100 percent of a mixture of N-(2-chloro-3-hydroxypropyl)trimethylammonium chloride and N-(3-chloro-2-hydroxypropyl)trimethylammonium chloride essentially free of N-(2,3-dichloropropyl)trimethylammonium chloride obtained by concentrating in vacuo the solution obtained by the process of claim 1.

References Cited

UNITED STATES PATENTS 3,346,563  10/1967  Shildneck et al. ____ 260—233.3

RICHARD D. LOVERING, Primary Examiner

I. GLUCK, Assistant Examiner

U.S. Cl. X.R.
260—233.3, 501.15